Oct. 15, 1957  W. H. WILLS  2,810,041
THERMOSTATIC DEVICE
Filed July 5, 1956
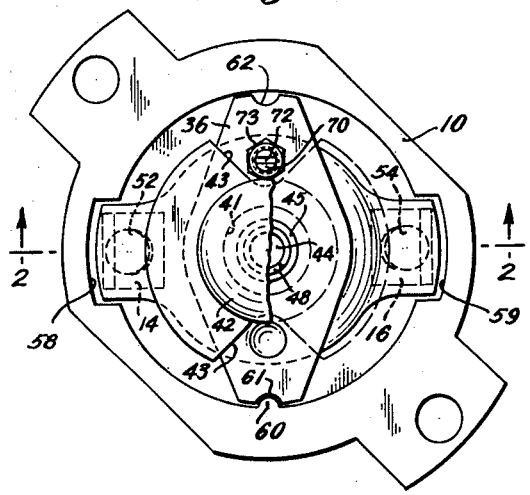
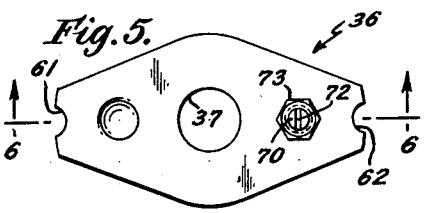
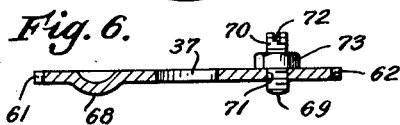
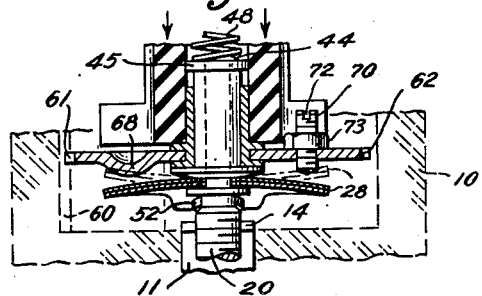
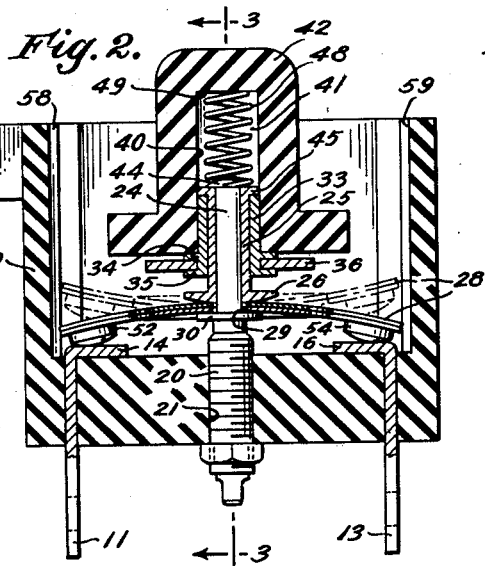
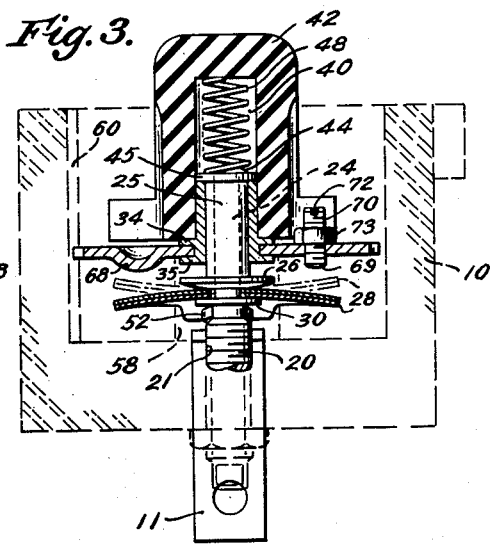
Inventor,
William H. Wills,
By William W. Sollow Jr.
Att'y.

United States Patent Office
2,810,041
Patented Oct. 15, 1957

2,810,041

THERMOSTATIC DEVICE

William H. Wills, Foxboro, Mass., assignor to Metals & Controls Corporation, Attleboro, Mass., a corporation of Massachusetts Application July 5, 1956, Serial No. 596,075

5 Claims. (Cl. 200—113)

This invention relates to thermostatic devices, and more particularly, to an improvement in that class of thermostatic devices which is typified by the inclusion of a snap-acting element and a presser member; said snap-acting element being responsive to a temperature change in one direction automatically to snap from a first condition to a second condition but being incapable of automatically snapping from said second condition to said first condition in response to normal temperature changes in the opposite direction, and said presser member being mounted for movement relative to said snap-acting element to force a projection carried by the presser member against each of two portions of the snap-acting element thereby to snap the snap-acting element from said second condition back to said first condition. By normal temperature change is meant a temperature change within a range which the device may be normally expected to encounter. An example of a thermostatic device falling within this class is disclosed in United States Letters Patent 2,199,388, granted May 7, 1940, to J. D. Bolesky.

One problem which presents itself with this class of thermostatic devices is that, after assembly of the presser member and the thermostatic element into operative relation with each other, the projections carried by the presser member must be adjusted toward and away from the thermostatic element so that resetting of the thermostatic element by actuation of the presser member can be effected according to the desired functions of the device. By resetting the thermostatic element is meant snapping the thermostatic element from the above-described second condition back to said first condition. By way of example, it may be pointed out that it is often desired that the thermostatic device be trip-free of the resetting means; that is, that the spacing of the above-mentioned projections relative to the thermostatic element be so adjusted that the thermostatic element will be free to snap from said first condition to said second condition automatically upon temperature change in the above-described one direction regardless of the position or actuation of the resetting means. It follows that when the device is trip-free, full depression of the presser member will not be effective to snap the thermostatic element from said second condition to said first condition over a particular temperature range. In some installations, it may be desired that the thermostatic device be nontrip-free, in which case this function may likewise be provided by appropriate adjustment of the projections carried by the presser member relative to the thermostatic element.

One common method in use to effect this adjustment of the projections carried by the presser member involves bending the presser member. That is, after assembling the presser member and the thermostatic element into operative relation with each other, the assembly is placed in a press and presser foot is forced against each of two diametrically opposed points on the presser member at the opposite side thereof from that at which each of the projections is disposed thereby to bend the presser member about its mounting means to bring each of the projections closer to the respective portions of thermostatic element adjacent thereto. This bending operation is continued until just after the thermostatic element is snapped from said second condition back to said first condition. Due to the "spring-back" of the metal of which the presser member is formed, the presser member is bent slightly past this point with the intention that when it springs back it will lie approximately in the stable position at which the thermostatic element snapped.

It will be readily realized that this method is no more than a trial and error procedure, since due to the vagaries of spring back, the presser member will not always spring back to the same extent. Accordingly, this procedure requires that the thermostatic element be subsequently manually snapped from said first condition to said second condition, and then the presser member must be actuated to determine whether or not it has sprung back to a stable position neither too close nor too remote from the thermostatic element for the calibration and type of operation desired. For example, if the presser member does not spring back to the desired extent, it is necessary that tools be inserted at diametrically opposite portions of the presser member against the opposite face thereof from that adjacent the exterior of the assembly, and then pulled back to bend the presser member about its mounting means thereby to move the projections slightly away from the thermostatic element. Again, the "spring-back" which results when the presser member is released by these tools renders this additional step incapable of being accurately effected, and therefore another trial and error aspect obtains. This procedure must be repeated along with testing of the assembly by actuating the resetting means after heating and/or cooling the thermostatic element to respective predetermined temperatures to be sure that the device can or cannot, as desired, be reset within prescribed ambient temperatures. It will be realized that the tolerance of the extent to which the presser member is bent during any of these above-mentioned bending steps ordinarily lies in the range of thousandths of an inch. Accordingly, this procedure requires that skilled workers be utilized for so adjusting the thermostatic device. Obviously, this procedure is time-consuming and expensive. Also, it will be realized that, for a given thermostatic element, the finer and more accurate the adjustment of these projections relative to the thermostatic element, the smaller or greater, as desired, may be the range of ambient temperatures over which the thermostatic element is capable of being snapped back from said second condition to said first condition by actuation of the presser member.

Accordingly, an object of this invention is to provide a novel thermostatic device of the above described class which is capable of being more easily, accurately and finely adjusted to effect the desired calibration and operating characteristics.

A further object of this invention is to provide a thermostatic device of the class described above which is capable of providing a smaller or greater, as desired, range of temperatures over which the device may be reset than those capable of being provided by other devices of this class.

A further object of the invention is to provide an improved thermostatic device of the above-described class by which the time, effort and expense of adjusting this device due to trial and error procedures is avoided.

A further object of this invention is to provide a thermostatic device of the above-described class which is inexpensive to manufacture, and dependable and efficient in operation.

Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

Fig. 1 is a top plan view of a thermostatic device embodying the present invention;

Fig. 2 is a sectional view taken along line 2—2 in Fig. 1;

Fig. 3 is a sectional view partly in phantom and taken along line 3—3 in Fig. 2;

Fig. 4 is a fragmentary view similar to the corresponding portion of Fig. 3 but showing the push-button and presser member in fully depressed position;

Fig. 5 is a plan view of an improved presser member according to the present invention; and Fig. 6 is a sectional view taken along line 6—6 of Fig. 5.

Referring more particularly to the drawing, a thermostatic device of the above-described class is shown which includes a base or housing 10 formed of suitable electrically-insulating material such as one of the customary molded plastics. Base 10 carries two terminals 11 and 13, respectively, each of which is provided with an overturned portion 14 and 16, respectively. Terminals 11 and 13 are formed of a suitable electrically-conductive material such as silver, Monel or copper, or combinations thereof. Overturned portions 14 and 16, respectively, form a pair of mutually spaced contacts. An adjusting screw 20 is disposed in threaded engagement with a hole 21 provided by housing 10. Integral with adjusting screw 20 is a stem 24. A collar 25 is mounted on stem 24 and carries a flange 26 integral therewith. A thermostatic, snap-acting element 28 is provided which may be of the bimetallic type disclosed in United States Letters Patent 2,317,831 granted April 27, 1943, to V. G. Vaughan et al. Thermostatic element 28 is provided with a hole 29 substantially centrally thereof within which a portion of stem 24 is disposed. Thermostatic element 28 is loosely mounted on stem 24 and confined between flange 30 integral with stem 24 and flange 26 which is provided by collar 25. A bushing 33 is slidably mounted on collar 25 and carries a flange 34 and a bent over flange 35.

The exemplary construction shown in the drawings includes an improved presser member 36 which is provided with a substantially centrally disposed aperture. Presser member 36 is rigidly secured to bushing 33 by disposing the presser member against flange 34 with aperture 37 lying about a portion of the bushing, and then riveting or otherwise turning over flange 35 against the presser member. Surface 40 of bushing 33 is knurled and is tightly secured by a press fit within the open end of a socket 41 provided by push-button 42. Push-button 42 is provided with cut-away portions 43, 43 for a purpose later to become apparent. Stem 24 is turned over to form a head 44 which lies against a flange 45 provided by collar 25. Push-button 42 may also be formed of a suitable electrically-insulating material such as one of the customary molded plastics. Push-button 42 is resiliently biased to the position shown in Fig. 2 by means of a compression spring 48, one end of which is disposed against a surface 49 of push-button 42. The other end of spring 48 abuts the upper portions of head 44 and flange 45, respectively.

Thermostatic element 28 is prevented from substantial rotation about stem 24 by means of opposed recesses 58 and 59 provided by base 10 and within each of which lies one end portion of the thermostatic element. Each end portion of element 28 carries an electrical contact 52 and 54, respectively. Presser member 36, along with bushing 33 and button 42, is prevented from substantial rotation about stem 24 by means of an elongated projection 60 provided by base member 10 and which interfits with one of complementary recesses 61 and 62 provided by the presser member. Projection 60 is engaged with recess 61 in the assembly shown in Fig. 1.

For additional details of the structure and function of the device, reference is hereby made to the above-named patent to J. D. Bolesky.

The improved presser member 36 of this invention may take the form as best shown in Figs. 5 and 6. In this form, presser member 36 provides a first projection 68 in the form of an integral bump which may be formed at the same time that presser member 36 is stamped out. A second projection is formed by the protruding end portion 69 of an adjusting screw 70, which screw is threadedly engaged with an aperture 71 provided in the presser member. Screw 70 is provided with a slot 72 by which the screw may be rotated with a tool such as a screw driver. A lock nut 73 may be provided by means of which screw 70 may be locked in the desired adjusted position relative to the portion of presser member 36 at which it is mounted.

Contacts 14 and 16 provided by terminals 11 and 13, respectively, cooperate with contacts 52 and 54, respectively, carried by thermostatic element 28. When the thermostatic element is in the full-line shape or condition shown in Fig. 2, it bridges and electrically connects contacts 14 and 16. Thermostatic element 28 is responsive to a change of temperature in one direction automatically to snap from a first shape or condition as shown in full lines in Fig. 2 to a second shape or condition as shown in dotted lines in Fig. 2. When the thermostatic element is in the dotted-line shape or condition shown in Fig. 2, it is separated from and electrically disconnects contacts 14 and 16. The characteristics of this thermostatic element are such that it is incapable of snapping from this second shape or condition back to the first shape or condition automatically in response to normal temperature changes in the opposite direction.

In order to snap the thermostatic element back to said first condition from said second condition (that is, to reset the thermostatic element), push-button 42 must be depressed to force projections 68 and 69 against thermostatic element 28 at respective portions thereof lying at opposite sides of the portion of the thermostatic element at which it is mounted by stem 24. It will be apparent that downward movement of push-button 42 as shown in Fig. 2 is limited by engagement of flange 35 with flange 26. In order that the device be trip-free as explained above, presser member 36 is so adjusted that projections 68 and 69 will engage with and throw the thermostatic element to its full-line position as shown in Fig. 2 only slightly before push-button 42 has been fully depressed. It will be obvious that mass production manufacture requires that the relative spacing between thermostatic element 28 and each of projections 68 and 69 be adjusted after the presser member has been assembled into operative relation with the thermostatic element. Rather than adjust this spacing of projections 68 and 69 with respect to thermostatic element 28 by bending the presser member as described above, it has been found that many of the objections to this bending method are obviated by the improved structure of presser member 36 as described above. That is, one of the projections, in this case projection 68, may be provided in the form of an integral projection as in the construction illustrated and described in the above cited patent to J. D. Bolesky; and the other projection, in this case projection 69, is provided in the form whereby it is adjustable relative to the portion of the presser member at which it is mounted. Also, it has been found that in a device of the above-described class having a presser member which is provided with one integral, fixed projection and only one projection which is adjustable relative to the portion of the presser member at which it is mounted, the combined effect of the integral projection and the adjustable projection is such that the said adjustable projection can be regulated to prevent or to permit, as desired, the reset function over not only as great but over significantly greater temperature ranges than those possible when the presser member is adjusted by bending it.

For example, to adjust the presser member as embodied in this invention to render trip-free operation of the thermostatic switch, the presser member and the thermostatic element are first assembled into operative relationship with each other and then exposed to an ambient temperature at and below which it is desired that the device be capable of being reset. Presser member 36 is then moved to its fully depressed position (and assuming that although projection 68 then engages the thermostatic element, the latter remains in the dotted-line shape or condition shown in Fig. 2), and screw 70 is turned to force projection 69 against the thermostatic element. The cut-out portion 43 adjacent screw 70 permits convenient access to screw 70. Screw 70 is turned until the thermostatic element snaps to the full-line position shown in Figs. 2, 3 and 4. Preferably, screw 70 is further turned a slight amount, and then lock nut 73 is tightened against the presser member. Without more, the device has then been adjusted to provide trip-free operation. That is, upon a sufficient change in the ambient temperature or the temperature of the thermostatic element or both, the thermostatic element will be free to snap contacts 52 and 54 away from contacts 14 and 16, respectively, even though the presser member is held in its fully depressed position.

It will be apparent that by further adjusting projection 69 downwardly as viewed in Fig. 2, the thermostatic element can be prevented from snapping contacts 52 and 54 away from contacts 14 and 16, respectively, when the presser member is fully depressed, thus rendering the device nontrip-free.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:
1. In combination, a base, a pair of mutually spaced contacts supported by said base, a snap-acting thermostatic element, means carried by said base and mounting said thermostatic element at a first portion thereof, said first portion of said thermostatic element being disposed between a second and a third portion of said thermostatic element, said snap-acting element being responsive to temperature change in one direction automatically to snap from a first condition to a second condition but being incapable of automatically snapping from said second condition to said first condition in response to a normal temperature change in the opposite direction, said thermostatic element bridging and electrically connecting said contacts when in one of said conditions and being separated from and thereby electrically disconnecting said contacts when in the other of said conditions, a presser member mounted adjacent said thermostatic element for movement relative thereto, said relative movement of the presser member being limited in a direction toward said thermostatic element, at least two projections carried by said presser member for engagement with said thermostatic element, and at least one of said projections being adjustable toward and away from said thermostatic element and relative to the portion of the presser member at which said one projection is carried.

2. In combination, a base, a pair of mutually spaced contacts supported by said base, a snap-acting thermostatic element, means carried by said base and mounting said thermostatic element at a first portion thereof, said first portion of said thermostatic element being disposed between a second and a third portion of said thermostatic element, said snap-acting element being responsive to temperature change in one direction automatically to snap from a first condition to a second condition but being incapable of automatically snapping from said second condition to said first condition in response to a normal temperature change in the opposite direction, said thermostatic element bridging and electrically connecting said contacts when in one of said conditions and being separated from and thereby electrically disconnecting said contacts when in the other of said conditions, a presser member mounted adjacent said thermostatic element for movement relative thereto, said movement being limited in a direction toward said thermostatic element, a first projection mounted on said presser member at a portion thereof for adjustment relative to said last-mentioned portion toward and away from said thermostatic element, said presser member having a second projection formed integrally therewith at another portion thereof, said presser member being movable to force one of said projections against said second portion of the thermostatic element and to force the other of said projections against said third portion of the thermostatic element thereby to snap said thermostatic element from second condition to said first condition.

3. The combination as set forth in claim 2 wherein said first projection is provided by an adjusting screw threadedly engaged with said presser member.

4. In combination, a base, a pair of mutually spaced contacts supported by said base, a snap-acting thermostatic element, means carried by said base and mounting said thermostatic element at a first portion thereof, said first portion of said thermostatic element being disposed between a second and a third portion of said thermostatic element, said snap-acting element being responsive to temperature change in one direction automatically to snap from a first condition to a second condition but being incapable of automatically snapping from said second condition to said first condition in response to a normal temperature change in the opposite direction, said thermostatic element bridging and electrically connecting said contacts when in one of said conditions and being separated from and thereby electrically disconnecting said contacts when in the other of said conditions, a presser member mounted adjacent said thermostatic element, said presser member carrying two projections, one of said projections being engageable with said thermostatic element at said second portion thereof and the other of said projections being engageable with said thermostatic element at said third portion thereof, said one projection being mounted for adjustment with respect to said presser member toward and away from said thermostatic element, and said presser member being movable relative to said thermostatic element to force each of said projections against the portion of the thermostatic element with which it is engageable thereby to snap said thermostatic element from said second condition to said first condition.

5. The combination as set forth in claim 4 wherein said first projection comprises a portion of an adjusting screw, said adjusting screw being threadedly engaged with said presser member.

References Cited in the file of this patent
UNITED STATES PATENTS

| | | |
|---|---|---|
| 1,767,709 | Smith | June 24, 1930 |
| 2,032,136 | Lee | Feb. 25, 1936 |
| 2,434,984 | Bolesky et al. | Jan. 27, 1948 |